United States Patent Office 3,236,830
Patented Feb. 22, 1966

3,236,830
PROCESS FOR THE PREPARATION OF
POLYSACCHARIDES
Gerhard Schramm, Tübingen, Horst Grötsch, Frankfurt am Main, and Wolfgang Pollmann, Tübingen, Germany, assignors to Farbwerke Hoechst Aktiengesellschaft vormals Meister Lucius & Brüning, Frankfurt am Main, Germany, a corporation of Germany
No Drawing. Filed May 21, 1962, Ser. No. 196,442
Claims priority, application Germany, May 24, 1961,
F 33,983
4 Claims. (Cl. 260—209)

The present invention relates to a process for the preparation of polysaccharides from sugars in the presence polyphosphoric acid esters.

It has already been known that polysaccharides are formed by polycondensation in acid solution. There is obtained, for example, a glucoside in a very small quantity when treating glucose in dry dimethyl sulfoxide with hydrogen chloride (cf. Chemische Berichte, vol. 91 (1958), page 1214). According to "Angew. Chem., 72 (1960), page 209" the yield can be improved by distilling off the water formed during the reaction, but the polysaccharides thus obtained exhibit a strongly branched structure.

Now, we have found that polysaccharides can be obtained in a simple manner and with good yields when sugars are contacted with polyphosphoric acid alkyl esters.

For the process according to the present invention there can be used as starting substances such sugars or sugar derivatives as contain a carbonyl function. For the process of the present invention there are suitable: aldoses and ketoses, for example, pentoses, hexoses and heptoses, such as arabinose, ribose, xylose, lyxose, fructose, glucose, allose, altrose, gulose, talose, mannose, galactose, idose, psicose, sorbose, mannoheptulose, galaheptulose, guloheptulose and desoxy-sugars, for example, rhamnose, digitalose, fucose, and desoxy-ribose and acylated amino sugars of the N-acetylglucosamine, N-acetylgalactosamine and N-acetylmannosamine type. Furthermore, there may also be used as starting substances oligo-saccharides that contain a carbonyl function, for example, lactose and maltose, cellobiose, gentiobiose, mellibiose, as well as monocarboxylic acids of sugars, for example, glucoronic acid, galacturonic acid, in the form of their esters with alcohols such as methanol, ethanol, propanol, butanol and benzyl alcohol. Moreover, there may also be used mixtures of monosaccharides and oligo-saaccharides containing a free carbonyl function which are obtained in acid hydrolysis of celulose, starch and similar natural substances.

The polyphosphoric acid alkyl esters of the present invention can be prepared, for example, according to "Berichte der Deutschen Chemischen Gesellschaft," vol. 43 (1910), page 1857. In this process it is of advantage to use polyphosphoric acid ethyl esters. But it is also possible to use the corresponding methyl, isopropyl and propyl esters. The further course of the reaction is described in the following scheme with the example of a pyranosoid sugar. From the pyranose and the polyphosphoric acid esters there is formed in this case an intermediate product which is defined in the scheme as starting substance, wherein X represents the radical of the polyphosphoric acid esters. This intermediate compound then reacts with another sugar molecule whrile HOX separates and a glycosidic linkage is performed.

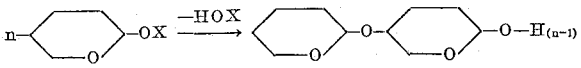

The degree of the condensation can be varied by an appropriate choice of the reaction conditions. If the process is carried out in dilute solution and in the presence of small quantities of polyhphosphoric acid esters, low molecular reaction products are obtained, whereas in concentrated solution or in the absence of solvents and in the presence of an excess of polyphosphoric acid esters high molecular polysaccharides are formed which may contain phosphate groups because polyphosphoric acid esters act with preference on the acetalic OH-group at the $C_1$. Under more severe conditions, however, further hydroxy groups can be phosphorylated. The mixture of low molecular products obtained under the above-mentioned mild conditions can, for example, be separated chromatographically. Under severe conditions, i.e., in concentrated solution or without solvents and with the use of an excess of polyphosphoric acid esters, there is obtained from ribose a high molecular product containing about 1 mol of phosphate per unit of ribose. The degree of phosphorylation of the polysaccharides naturally depends on the quantity of the polyphosphoric acid esters used and on the reaction period. It can, however, be influenced by an appropriate choice of the solvent. In case, for example, the polycondensation of the ribose is carried out in formamide, there is obtained a reaction product free from phosphate which can easily be separated from phosphate containing admixtures by column chromoatography on a basic exchanger. The action of the formamide can probably be attributed to the action of formamide on the polyphosphoric acid esters with dehydration to yield hydrocyanic acid, thus weakening the phosphorylating action. According to the process of the present invention there are formed from glucose in similar manner phosphate-free and phosphate-containing polyglucosides the molecular weights of which range from about 30–500,000. The corersponding polysaccharides can be prepared in analogous manner, for example, from fructose and n-acetylglucosamine. High molecular polysaccharides are formed especially when dimethylsulfoxide is used as solvent.

The high specific viscosity of the polysaccharides formed, which approximately corresponds to that of cellulose of the equal degree of polymerization, proves that the products obtained are chiefly straight chained, linear macromolecules.

The process of the present invention is advantageously carried out in such a way that the starting material is dissolved in an inert solvent and is contacted with the polyphosphoric acid esters for some hours. Working up the product is preferably carried out by separating the reaction product by precipitation by means of a liquid which does not dissolve the product to any practical extent, for example, chloroform or methanol, dissolving the product in water, dialyzing the solution and steaming it to dryness or lyophilizing it.

The most favorable temperature used for the preparation depends on the type of the starting sugar. Ribose can be polycondensed even at room temperature, whereas with other sugars a temperature up to 70° C., preferably 25–65° C., is chosen. Temperatures between 15° C. and 70° C. can be employed.

Appropriate solvents for the process of the present invention are those which do not contain reactive hydroxyl or amino groups and which are good solvents for sugar and polyphosphoric acid esters. Especially the esters and alkyl amides of numerous acids, for example, diethylphosphite, phosphoric acid trisdimethyl amide, dimethyl sulfoxide, n-methyl-pyrrolidone, formamide and dimethyl formamide are suitable. It is however, to be pointed out that small quantities of water do not disturb the reaction.

As compared with the known methods for the preparation of polysaccharides, the present process is distinguished in for the first time polyaccharides having a low degree of branching and a high degree of steric uniformity can be obtained.

Until now those polysaccharides have not been obtained by a synthetic process. It is especially remarkable that according to the process of the present invention polysaccharides that are very sensitive to acids, for example, polyribosides can also be prepared. The mild reaction conditions avoid destroying the sugar used. A further essential advantage is that small quantities of water do not disturb the reaction and the troublesome and often difficult drying of the sugars and solvents used is superfluous.

The products of the present process are of technical importance since, for example, they can easily be attached to water-insoluble medicaments and can render them water-soluble.

Since some products obtained in the present process, for example, polyribosides, rehydrolize even in a very weakly acid solution, a temporary water solubility can be obtained in a simple manner, as is desired with various dyestuffs or finishing agents. Polysaccharides from special sugars, for example, colitose, can also be used as artificial antigens. The products with an average molecular weight between 20 and 50,000 can be used as blood substitute agents. The products of the process are of special importance as adsorption agents in chromatography. The viscosity values indicated in the following examples were calculated on the relative viscosity measured at 22° C. according to the following formula:

Viscosity value=lim.

$$c. \rightarrow 0 \ \frac{\eta r - 1}{c.}$$

(c.=concentration in grams/100 cc.)

The following examples serve to illustrate the invention, but they are not intended to limit it thereto:

*Example 1.—Phosphate-containing polygulcoside*

5 grams of glucose and 10 grams of polyphosphoric acid esters were dissolved in 10 cc. of dimethyl formamide. The solution was then stirred for 6 hours at 50–60° C. After cooling, the reaction product was precipitated by means of chloroform, dissolved in 50 cc. of water and dialyzed for 48 hours. The liquid in the dialyzer was concentrated to dryness by steaming in a rotation evaporator, the residue was triturated with methanol, washed with ether and dried. A white powder containing 5% of phosphorus was obtained in a yield of 40% (calculated on the glucose used). A molecular weight of about 50,000 was detected by measuring viscosity and sedimentation.

Viscosity value: 0.1.

The optical rotation was +38°. The optical rotation and the infra-red spectrum indicated a β-glucosidic linkage.

*Example 2.—Phosphate-free polyglucoside*

5 grams of glucose hydrate and 10 grams of polyphosphoric acid esters were dissolved in 50 cc. of formamide and heated for 6 hours at 50–60° C., while stirring. After cooling, the reaction solution was mixed with the same volume of water and dialyzed for 48 hours. The liquid in the dialyzer was concentrated to dryness by steaming in a rotation evaporator. The residue was triturated with methanol and washed with ether. The pulverulent residue was taken up in a little water and passed through a column of the basic exchanger Dowex 1×10 pretreated with formic acid. By elution with water a phosphate-free polyglucoside of a molecular weight of about 40,000 could be obtained in a yield of 15%.

Viscosity value: 0.1.

*Example 3.—Phosphate-containing polyriboside*

5 grams of riboside were polycondensed and worked up as described in Example 1. Polyriboside was obtained in a yield of about 40% calculated on the ribose used. The product formed was a white powder and contained 8% of phosphorus. A molecular weight of about 50,000 was detected by measuring viscosity and sedimentation.

Viscosity value: 0.1.

The optical rotation was +20° (ribose: −20°). The strong dextro-rotation indicated an α-glucosidic linkage.

*Example 4.—Phosphate-free polyriboside*

5 grams of ribose and 10 grams of polyphosphoric acid esters were dissolved in 50 cc. of formamide, heated for 6 hours at 50–60° C. and worked up as described in Example 2. After elution from the Dowex 1×10 column, phosphate-free polyriboside was obtained in a yield of about 15%. A molecular weight of about 40,000 was detected by measuring viscosity and sedimentation. Decomposition tests with sodium periodate indicated that the product was sterically uniform and showed a preponderantly 1–5 glycosidic linkage.

Viscosity value: 0.1.

*Example 5.—Phosphate-containing polyfructoside*

Under the conditions described in Example 1, a polyfructoside was obtained from 5 grams of fructose in a yield of 30–35% calculated on the fructose used. Said polyfructoside, the molecular weight of which amounted to about 50,000 was obtained in the form of a white powder and exhibited a phosphorus content of 6%.

The optical rotation was ±0° (fructose: −92°).

Viscosity value: 0.1.

*Example 6.—Phosphate-containing poly-n-acetylglucosamine*

5 grams of n-acetylglucosamine and 10 grams of polyphosphoric acid esters were reacted as described in Example 1. When working up the reaction product correspondingly, there was obtained a poly-n-acetylglucosamine in the form of a brownish powder in a yield of 25–30% calculated on the n-acetylglucosamine used. The product contained 5% of phosphorus. The sedimentation constant was practically the same as with the polyglucoside of Example 1.

The optical rotation amounted to +30°.

Viscosity value: 0.1.

*Example 7.—Polyglucose*

100 grams of glucose were added to a well cooled solution of 225 grams of polyphosphoric acid esters in 225 grams of dimethylsulfoxide while stirring vigorously and cooling with water. During this process heating at 40–45° C. set in. The solution was first stirred for 2 hours at 50° C. and then heated for a further 2 hours at 65° C. After cooling, the clear solution was poured into 5 liters of methanol, whereby a white precipitate separated which was dissolved in 500 cc. of water after being washed twice with methanol and acetone and dialyzed for 4 days against flowing water.

After lyophilization there was obtained a white substance in a yield up to 65%. The optical rotation amounted to +69°. Phosphorus content: 1%.

Viscosity value: 0.4.

*Example 8*

100 grams of glucose were added to a well cooled solution of 225 grams of polyphosphoric acid esters in 225 grams of dimethylsulfoxide while stirring vigorously and cooling with water. Heating to 40–45° C. set in. The solution was stirred for 6 hours at 50° C., and after cooling, the clear solution was poured into 6 liters of methanol. Working up was carried out according to example 7. Yield: 35% of the theory. Phosphorus content: 0.6%. The optical rotation amounted to +70°.

Viscosity value: 0.08.

We claim:

1. The process of preparing polysaccharides which comprises contacting sugars containing a carbonyl function with polyphosphoric acid lower alkyl esters.

2. The process of preparing polysaccharides which comprises contacting a member selected from the group consisting of arabinose, ribose, xylose, lyxose, fructose, glucose, allose, altrose, gulose, talose, mannose, galactose, idose, psicose, sorbose, mannoheptulose, galaheptulose, guloheptulose, rhamnose, digitalose, fucose, desoxyribose, N-acetylglucosamine, N-acetylgalctosamine, N-acetylmannosamine, lactose, maltose, cellobiose, gentiobiose, mellibiose, glucuronic and galacturonic lower alkyl esters with a polyphosphoric acid lower alkyl ester.

3. A process as claimed in claim 1, wherein the said reaction components are contacted in a solvent selected from the group consisting of diethylphosphite, phosphoric acid trisdimethyl amide, dimethyl sulfoxide, n-methyl pyrrolidone, formamide and dimethyl formamide at a temperature in the range of 15 to 70° C.

4. A process as claimed in claim 2, wherein the said reaction components are contacted in a solvent selected from the group consisting of diethylphosphite, phosphoric acid trisdimethyl amide, dimethyl sulfoxide, N-methyl pyrrolidone, formamide and dimethyl formamide at a temperature in the range of 15 to 70° C.

References Cited by the Examiner
UNITED STATES PATENTS

| | | | |
|---|---|---|---|
| 2,027,904 | 1/1936 | Farber | 260—209 |
| 2,375,564 | 5/1945 | Leuck | 260—209 |
| 2,387,275 | 10/1945 | Leuck | 260—209 |
| 2,400,423 | 5/1946 | Leuck | 260—209 |
| 2,436,967 | 3/1948 | Leuck | 260—209 |
| 2,719,179 | 9/1955 | Mora | 260—209 |
| 3,015,654 | 1/1962 | Hodge et al. | 260—210 |

OTHER REFERENCES

Pigman, "The Carbohydrates," 1957, pp. 682, 683, 703–705, Academic Press Inc., New York, N.Y.

LEWIS GOTTS, *Primary Examiner.*

WALTER A. MODANCE, *Examiner.*